US012566846B2

(12) United States Patent
  Griffin et al.

(10) Patent No.: US 12,566,846 B2
(45) Date of Patent: Mar. 3, 2026

(54) TURING MACHINE AGENT FOR BEHAVIORAL THREAT DETECTION

(71) Applicant: International Business Machines Corporation, Armonk, NY (US)

(72) Inventors: Adam Lee Griffin, Cohasset, MA (US);
  Balaji Muthusamy Pandurangan,
  Amsterdam (NL); Saurabh Yadav,
  Bangalore (IN); Neha Mittal, Rohini
  (IN); Emmanuel Lopez Benitez,
  Zapopan (MX)

(73) Assignee: International Business Machines Corporation, Armonk, NY (US)

( * ) Notice: Subject to any disclaimer, the term of this
  patent is extended or adjusted under 35
  U.S.C. 154(b) by 57 days.

(21) Appl. No.: 18/608,599

(22) Filed: Mar. 18, 2024

(65) Prior Publication Data

US 2025/0291905 A1      Sep. 18, 2025

(51) Int. Cl.
  *G06F 21/55*      (2013.01)

(52) U.S. Cl.
  CPC ................................. *G06F 21/554* (2013.01)

(58) Field of Classification Search
  None
  See application file for complete search history.

(56) References Cited

U.S. PATENT DOCUMENTS

| | | | |
|---|---|---|---|
| 8,347,398 B1 | 1/2013 | Weber | |
| 8,887,286 B2 | 11/2014 | Dupont et al. | |
| 11,341,374 B2 | 5/2022 | Batoukov et al. | |
| 12,248,883 B1 * | 3/2025 | Rideout | ................. G06N 20/20 |
| 2023/0259787 A1 | 8/2023 | David | |
| 2023/0359902 A1 | 11/2023 | Cefalu et al. | |
| 2023/0396637 A1 | 12/2023 | Hebbagodi et al. | |
| 2024/0354319 A1 * | 10/2024 | Dinu | ................... G06F 16/3329 |

(Continued)

FOREIGN PATENT DOCUMENTS

| | | | |
|---|---|---|---|
| CN | 117113339 A * | 11/2023 | ........... G06F 21/554 |

OTHER PUBLICATIONS

Ibm, "Threat intelligence insights," IBM Cloud Pak for Security, 2023, 6 pages, retrieved from http:/web.archive.org/web/20230627022441/https://www.IBM.com/products/cloud-pak-for-security/threat-intelligence-insights.

(Continued)

*Primary Examiner* — Benjamin E Lanier
(74) *Attorney, Agent, or Firm* — Zilka-Kotab, P.C.

(57)      ABSTRACT

A computer-implemented method, according to one approach, includes: causing a multi-layer neural network to evaluate a user query received from an endpoint device by processing the user query with one or more initial layers of the neural network. In response to receiving an output from the initial layers at a supplemental threat detection layer of the neural network, the user query processed with the threat detection layer. Processing the user query with the threat detection layer includes using a classifier to compare the user query to activation data outlining known illegitimate queries. Moreover, combinational reasoning is used to determine whether the user query is legitimate based at least in part on: an output of the classifier, and behavioral information received from a threat intel pattern. The user query is further intentionally rejected in response to the threat detection layer determining the user query is not legitimate.

16 Claims, 7 Drawing Sheets

(56) References Cited

U.S. PATENT DOCUMENTS

| | | | |
|---|---|---|---|
| 2025/0111039 A1* | 4/2025 | Mantin .................. | G06F 21/577 |
| 2025/0165589 A1* | 5/2025 | Bannihatti Kumar .. | G06F 40/44 |

OTHER PUBLICATIONS

Greshake et al., "Not what you've signed up for: Compromising Real-World LLM-Integrated Applications with Indirect Prompt Injection," arXiv, 2023, 33 pages, retrieved from https://arxiv.org/abs/2302.12173.

IBM, "IBM Security Randori Recon," IBM, 2024, 8 pages, retrieved from https://www.ibm.com/products/randori-recon.

IBM, "IBM Security QRadar Suite," IBM, 2024, 9 pages, retreived from https://www.ibm.com/qradar.

IBM, "IBM Security QRadar Edr," IBM, 2024, 13 pages, retrieved from https://www.ibm.com/products/qradar-edr.

IBM, "IBM Cloud Pak for Security," IBM, 2024, 13 pages, retrieved from https://www.ibm.com/products/cloud-pak-for-security.

* cited by examiner

100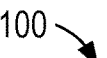

COMPUTER 101

PROCESSOR SET 110

PROCESSING CIRCUITRY 120        CACHE 121

COMMUNICATION FABRIC 111

VOLATILE MEMORY 112

PERSISTENT STORAGE 113

OPERATING SYSTEM 122

IMPROVED USER QUERY EVALUATION CODE

150

PERIPHERAL DEVICE SET 114

UI DEVICE SET 123        STORAGE 124        IoT SENSOR SET 125

NETWORK MODULE 115

WAN 102

END USER DEVICE 103

REMOTE SERVER 104

REMOTE DATABASE 130

PRIVATE CLOUD 106

GATEWAY 140

PUBLIC CLOUD 105

CLOUD ORCHESTRATION MODULE 141        HOST PHYSICAL MACHINE SET 142

VIRTUAL MACHINE SET 143        CONTAINER SET 144

From operation
310

312
Produce a response to the user query

314
Transmit the produced response to the endpoint device

TURING MACHINE AGENT FOR BEHAVIORAL THREAT DETECTION

BACKGROUND

The present invention relates to processing user queries, and more specifically, this invention relates to evaluating the legitimacy of user queries.

AI based models have emerged in recent years, providing users the ability to submit various requests (e.g., prompts) that are evaluated and answered in real-time. For example, AI chatbots have been developed over time to simulate human conversation. It should be noted that "AI chatbot" is an umbrella term which refers to different types of AI-based interfaces that can provide responses to various prompts or queries that are entered. In other words, AI chatbots may include any AI based software applications that aim to mimic human conversation using text or voice interactions to respond to prompts that are submitted by users. These interactions typically extend across an online connection and involve AI systems that are capable of maintaining a conversation with the users.

AI based models have traditionally been limited to single source models. Conventional products have thereby traditionally only been able to satisfy relatively simple prompts. However, as user submissions become more complex over time, these conventional products have been forced to process the more complex prompts for longer amounts of time, thereby increasing resource consumption in an attempt to remain relevant. While this maintains operation at the expense of efficiency, single source models have finite capabilities.

As the size and complexity of AI based models, like large scale neural networks, continue to increase in an attempt to field increasingly complex queries, this has also increased the attack surface of the models themselves. AI based models have thereby become more susceptible to nefarious attacks that may be conducted in a variety of different ways. Accordingly, there exists a need to develop an intelligent system capable of detecting attempts to exploit AI based models.

SUMMARY

A computer-implemented method (CIM), according to one approach, includes: causing a multi-layer neural network to evaluate a user query received from an endpoint device by processing the user query with one or more initial layers of the neural network. In response to receiving an output from the initial layers at a supplemental threat detection layer of the neural network, the user query processed with the threat detection layer. Processing the user query with the threat detection layer includes using a classifier to compare the user query to activation data outlining known illegitimate queries. Moreover, combinational reasoning is used to determine whether the user query is legitimate based at least in part on: an output of the classifier, and behavioral information received from a threat intel pattern. The user query is further intentionally rejected in response to the threat detection layer determining the user query is not legitimate.

A computer system (CS), according to another approach, includes: a processor set, a set of one or more computer-readable storage media, and program instructions. Moreover, the program instructions are collectively stored in the set of one or more storage media for causing the processor set to perform the foregoing CIM.

A computer program product (CPP), according to yet another approach, includes: a set of one or more computer-readable storage media, and program instructions. The program instructions are collectively stored in the set of one or more storage media, and are for causing a processor set to perform the foregoing CIM.

Other aspects and implementations of the present invention will become apparent from the following detailed description, which, when taken in conjunction with the drawings, illustrate by way of example the principles of the invention.

BRIEF DESCRIPTION OF THE DRAWINGS

FIG. 1 is a diagram of a computing environment, in accordance with one approach.

DETAILED DESCRIPTION

Figure 2A:
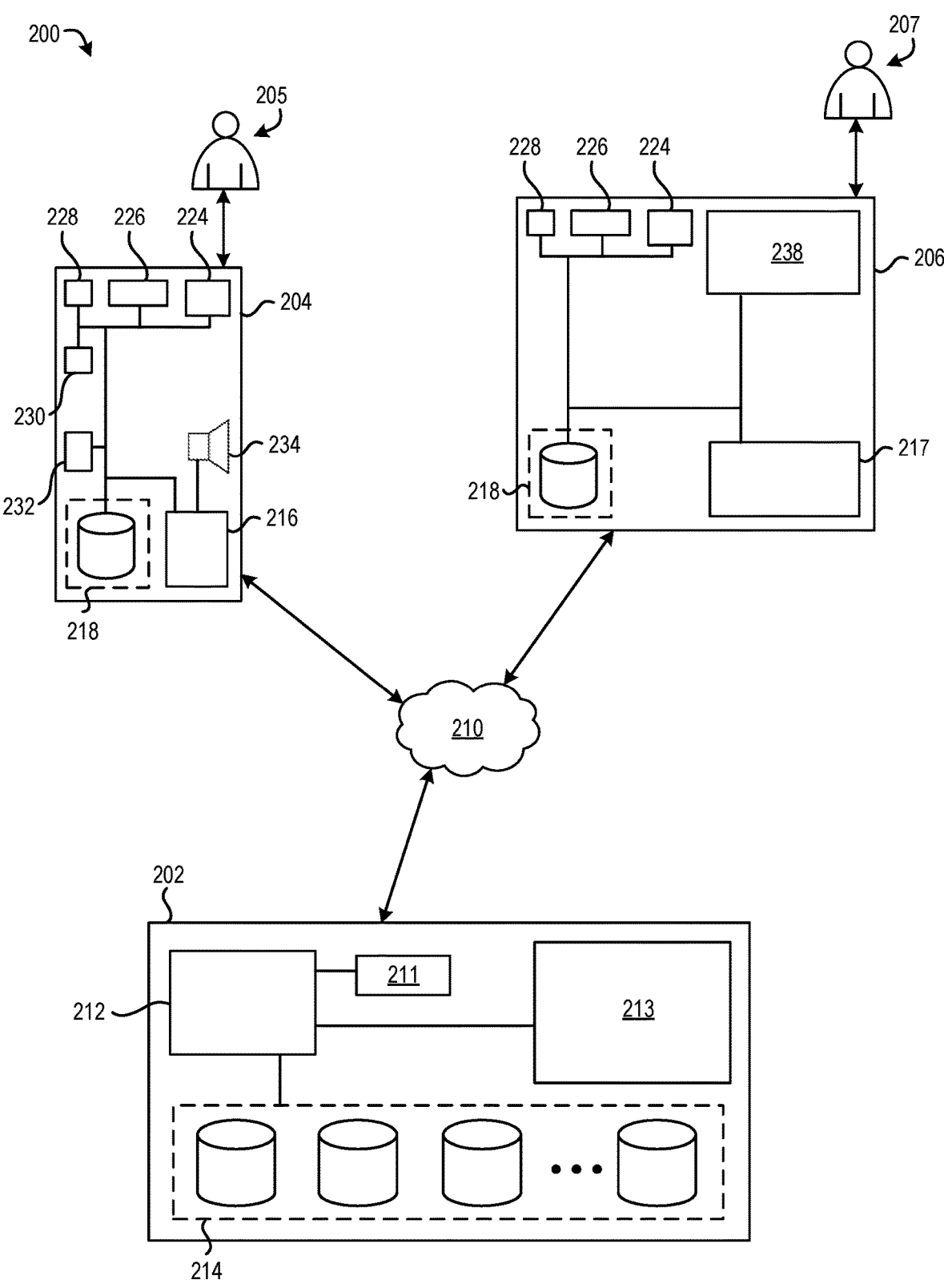
FIG. 2A is a representational view of a distributed system, in accordance with one approach.

The following description is made for the purpose of illustrating the general principles of the present invention and is not meant to limit the inventive concepts claimed herein. Further, particular features described herein can be used in combination with other described features in each of the various possible combinations and permutations.

Unless otherwise specifically defined herein, all terms are to be given their broadest possible interpretation including meanings implied from the specification as well as meanings understood by those skilled in the art and/or as defined in dictionaries, treatises, etc.

It must also be noted that, as used in the specification and the appended claims, the singular forms "a," "an" and "the" include plural referents unless otherwise specified. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The following description discloses several preferred approaches of systems, methods and computer program products for detecting and preventing illegitimate user queries. Approaches herein introduce models having supplemental layers that are configured to detect and block illegitimate (e.g., malicious) queries. These supplemental layers also receive continuous updates over time, allowing them to maintain an updated understanding of security based trends associated with illegitimate queries and other security based attacks. The models in approaches herein may thereby be effective in adapting to changes in security based attacks, while also providing accurate responses to legitimate (non-threatening) queries, e.g., as will be described in further detail below.

In one general approach, a CIM includes: causing a multi-layer neural network to evaluate a user query received from an endpoint device by processing the user query with one or more initial layers of the neural network. In response to receiving an output from the initial layers at a supplemental threat detection layer of the neural network, the user query processed with the threat detection layer. Processing the user query with the threat detection layer includes using a classifier to compare the user query to activation data outlining known illegitimate queries. Moreover, combinational reasoning is used to determine whether the user query is legitimate based at least in part on: an output of the classifier, and behavioral information received from a threat intel pattern. The user query is further intentionally rejected in response to the threat detection layer determining the user query is not legitimate.

In another general approach, a CS includes: a processor set, a set of one or more computer-readable storage media, and program instructions. Moreover, the program instructions are collectively stored in the set of one or more storage media for causing the processor set to perform the foregoing CIM.

In yet another general approach, a CPP includes: a set of one or more computer-readable storage media, and program instructions. The program instructions are collectively stored in the set of one or more storage media, and are for causing a processor set to perform the foregoing CIM.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as improved user query evaluation code at block 150 for detecting and preventing illegitimate user queries, e.g., as will be described in further detail below. In addition to block 150, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 150, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

COMMUNICATION FABRIC 111 is the signal conduction path that allows the various components of computer 101 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface-type operating systems that employ a kernel. The code included in block 150 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

CLOUD COMPUTING SERVICES AND/OR MICRO-SERVICES (not separately shown in FIG. 1): private and public clouds 106 are programmed and configured to deliver cloud computing services and/or microservices (unless otherwise indicated, the word "microservices" shall be interpreted as inclusive of larger "services" regardless of size).

Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of APIs. One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

In some aspects, a system according to various embodiments may include a processor and logic integrated with and/or executable by the processor, the logic being configured to perform one or more of the process steps recited herein. The processor may be of any configuration as described herein, such as a discrete processor or a processing circuit that includes many components such as processing hardware, memory, I/O interfaces, etc. By integrated with, what is meant is that the processor has logic embedded therewith as hardware logic, such as an application specific integrated circuit (ASIC), a FPGA, etc. By executable by the processor, what is meant is that the logic is hardware logic; software logic such as firmware, part of an operating system, part of an application program; etc., or some combination of hardware and software logic that is accessible by the processor and configured to cause the processor to perform some functionality upon execution by the processor. Software logic may be stored on local and/or remote memory of any memory type, as known in the art. Any processor known in the art may be used, such as a software processor module and/or a hardware processor such as an ASIC, a FPGA, a central processing unit (CPU), an integrated circuit (IC), a graphics processing unit (GPU), etc.

Of course, this logic may be implemented as a method on any device and/or system or as a computer program product, according to various approaches.

As noted above, AI based models have emerged in recent years, providing users the ability to submit various requests (e.g., prompts) that are evaluated and answered in real-time. For example, AI chatbots have been developed over time to simulate human conversation. It should be noted that "AI chatbot" is an umbrella term which refers to different types of AI-based interfaces that can provide responses to various prompts or queries that are entered. In other words, AI chatbots may include any AI based software applications that aim to mimic human conversation using text or voice interactions to respond to prompts that are submitted by users. These interactions typically extend across an online connection and involve AI systems that are capable of maintaining a conversation with the users.

AI based models have traditionally been limited to single source models. Conventional products have thereby traditionally only been able to satisfy relatively simple prompts. However, as user submissions become more complex over time, these conventional products have been forced to process the more complex prompts for longer amounts of time, thereby increasing resource consumption in an attempt to remain relevant. While this maintains operation at the expense of efficiency, single source models have finite capabilities.

As the size and complexity of AI based models, like large scale neural networks, continue to increase in an attempt to field increasingly complex queries, this has also increased the attack surface of the models themselves. AI based models have thereby become more susceptible to nefarious attacks that may be conducted in a variety of different ways. Accordingly, there exists a need to develop an intelligent system capable of detecting attempts to exploit AI based models.

In sharp contrast to these shortcomings, approaches herein introduce models having supplemental layers that are configured to detect and block illegitimate (e.g., malicious) queries. These supplemental layers also receive continuous updates over time, allowing them to maintain an updated understanding of security based trends associated with illegitimate queries and other security based attacks. The models in approaches herein may thereby be effective in adapting to changes in security based attacks, while also providing accurate responses to legitimate (non-threatening) queries.

It should be noted that the added "supplemental layers" may be physically and/or logically integrated into the layers of an existing larger model. For example, approaches herein describe adding supplemental layers to existing multi-layer neural networks. However, this is in no way intended to be limiting, and approaches herein may be implemented in any type of AI based model that would be apparent to one skilled in the art after reading the present description. Accordingly, the added layer may be referred to as a "Turing machine agent" in some approaches. For instance, in some approaches the layer may be logically appended to (e.g., sit next to) an existing neural network model. The added layer may thereby receive the output of an adjacent layer of the existing neural network model, and an output of the added layer may be provided to another adjacent layer of the existing neural network model. In other approaches, the layer may actually be integrated as part of the processing performed on a physical component, e.g., such as an Artificial Intelligence Unit (AIU), graphics processing unit (GPU), Field Programmable Gate Array (FPGA), etc., performing chip (or component) based inferencing. Approaches herein may thereby be implemented in software and/or hardware, e.g., as will be described in further detail below.

Looking now to FIG. 2A, a system 200 having a distributed architecture is illustrated in accordance with one approach. As an option, the present system 200 may be implemented in conjunction with features from any other approach listed herein, such as those described with reference to the other FIGS., such as FIG. 1. However, such system 200 and others presented herein may be used in various applications and/or in permutations which may or may not be specifically described in the illustrative approaches or implementations listed herein. Further, the system 200 presented herein may be used in any desired environment. Thus FIG. 2A (and the other FIGS.) may be deemed to include any possible permutation.

As shown, the system 200 includes a central server 202 that is connected to a user device 204, and edge node 206 accessible to the user 205 and administrator 207, respectively. The user device 204 and edge node 206 may thereby be considered "endpoint devices," each of which are connected to the central server 202. The central server 202, user device 204, and edge node 206 are each connected to a network 210, and may thereby be positioned in different geographical locations. The network 210 may be of any type, e.g., depending on the desired approach. For instance, in some approaches the network 210 is a WAN, e.g., such as the Internet. However, an illustrative list of other network types which network 210 may implement includes, but is not limited to, a LAN, a PSTN, a SAN, an internal telephone network, etc. As a result, any desired information, data, commands, instructions, responses, requests, etc. may be sent between user device 204, edge node 206, and/or central server 202, regardless of the amount of separation which exists therebetween, e.g., despite being positioned at different geographical locations. According to some approaches, the central server 202 is a remote cloud server that is connected to (e.g., may be accessed by) user device 204 and/or edge node 206.

However, it should be noted that two or more of the user device 204, edge node 206, and central server 202 may be connected differently depending on the approach. According to an example, which is in no way intended to limit the invention, two servers (e.g., nodes) may be located relatively close to each other and connected by a wired connection, e.g., a cable, a fiber-optic link, a wire, etc.; etc., or any other type of connection which would be apparent to one skilled in the art after reading the present description.

The terms "user" and "administrator" are in no way intended to be limiting either. For instance, while users and administrators may be described as being individuals in various implementations herein, a user and/or an administrator may be an application, an organization, a preset process, etc. The use of "data," "datasets," and "information" herein are in no way intended to be limiting either, and may include any desired type of details, e.g., depending on the type of operating system implemented on the user device 204, edge node 206, and/or central server 202. In some approaches, datasets of textual entries (e.g., strings of alphanumeric characters) that are generated at the edge node 206 may be kept at the edge node 206 to ensure data security and retention. For example, datasets having sensitive information (e.g., personal data, financial data, intellectual property, etc.) may intentionally be retained at an edge server where the datasets were formed. However, other information deemed as not being sensitive may be sent to the central server 202 from user device 204 and/or edge node 206 for processing using one or more machine learning models.

With continued reference to FIG. 2A, the central server 202 includes a large (e.g., robust) processor 212 coupled to a cache 211, an AI module 213, and a data storage array 214 having a relatively high storage capacity. The AI module 213 may include any desired number and/or type of AI-based models, e.g., such as machine learning models, deep learning models, neural networks, etc. In preferred approaches, the AI module 213 includes models that have a supplemental threat detection layer added thereto. For instance, the AI module 213 preferably includes a multi-layer neural network with a supplemental threat detection layer added to the existing layers of the neural network. In some approaches, the AI module 213 may also include one or more context-aware multi-model aggregators that are able to (along with processor 212) satisfy a wide range of queries that may be received, e.g., from endpoint devices 204, 206 or any other devices that are connected to network 210. With respect to the present description, a "context-aware multi-model aggregator" refers to one or more models that have been trained such that they are configured to receive a user query, extract contextual information from the query, select various AI based models and/or combinations of various AI based models that may be used to solve the user query based at least in part on the extracted contextual information, and ultimately select a response to the user query (e.g., an "output") based on how the selected models and/or combinations of models respond to the user query. It follows that AI module 213 and/or processor 212 may be used to perform one or more of the operations in method 300 below to answer a user query in a most efficient and accurate way possible, e.g., as will be described in further detail below.

With continued reference to FIG. 2A, user device 204 includes a processor 216 which is coupled to memory 218. The processor 216 receives inputs from and interfaces with user 205. For instance, the user 205 may input information using one or more of: a display screen 224, keys of a computer keyboard 226, a computer mouse 228, a microphone 230, and a camera 232. The processor 216 may thereby be configured to receive inputs (e.g., text, sounds, images, motion data, etc.) from any of these components as entered by the user 205. These inputs typically correspond to information presented on the display screen 224 while the entries were received. Moreover, the inputs received from the keyboard 226 and computer mouse 228 may impact the information shown on display screen 224, data stored in memory 218, information collected from the microphone 230 and/or camera 232, status of an operating system being implemented by processor 216, etc. The electronic device 204 also includes a speaker 234 which may be used to play (e.g., project) audio signals for the user 205 to hear.

Queries may be submitted by user 205 using user device 204 and central server 202. For instance, queries that involve non-sensitive topics and/or data may be received from user 205 through user device 204 for evaluation using AI module 213 at central server 202. The queries may be received as a result of the user 205 using one or more applications, software programs, temporary communication connections, etc. running on the user device 204. For example, the user 205 may use user device 204 to enter (e.g., type) and upload a query to be evaluated and solved using processor 212 and/or AI module 213 of central server 202. As a result, a context-aware multi-model aggregator at the central server 202 may be used to efficiently evaluate and process even complex queries.

Looking now to the edge node 206, some of the components included therein may be the same or similar to those included in user device 204, some of which have been given corresponding numbering. For instance, controller 217 is coupled to memory 218, a display screen 224, keys of a computer keyboard 226, and a computer mouse 228. Additionally, the controller 217 is coupled to an AI module 238.

As described above with respect to AI module 213, the AI module 238 may include any desired number and/or type of AI-based models, e.g., such as machine learning models, deep learning models, neural networks, etc. However, in preferred approaches the AI module 238 includes models that have a supplemental threat detection layer added thereto. For instance, the AI module 238 preferably includes a multi-layer neural network with a supplemental threat detection layer added to the existing layers of the neural network. In some approaches, the AI module 238 may also include one or more context-aware multi-model aggregators that are able to (along with controller 217) satisfy a wide range of queries that may be received, e.g., from administrator 207. AI module 238 and/or controller 217 may thereby be used to perform one or more of the operations in method 300 below to answer user queries in a most efficient and accurate way possible, e.g., as will be described in further detail below.

Figure 2B:
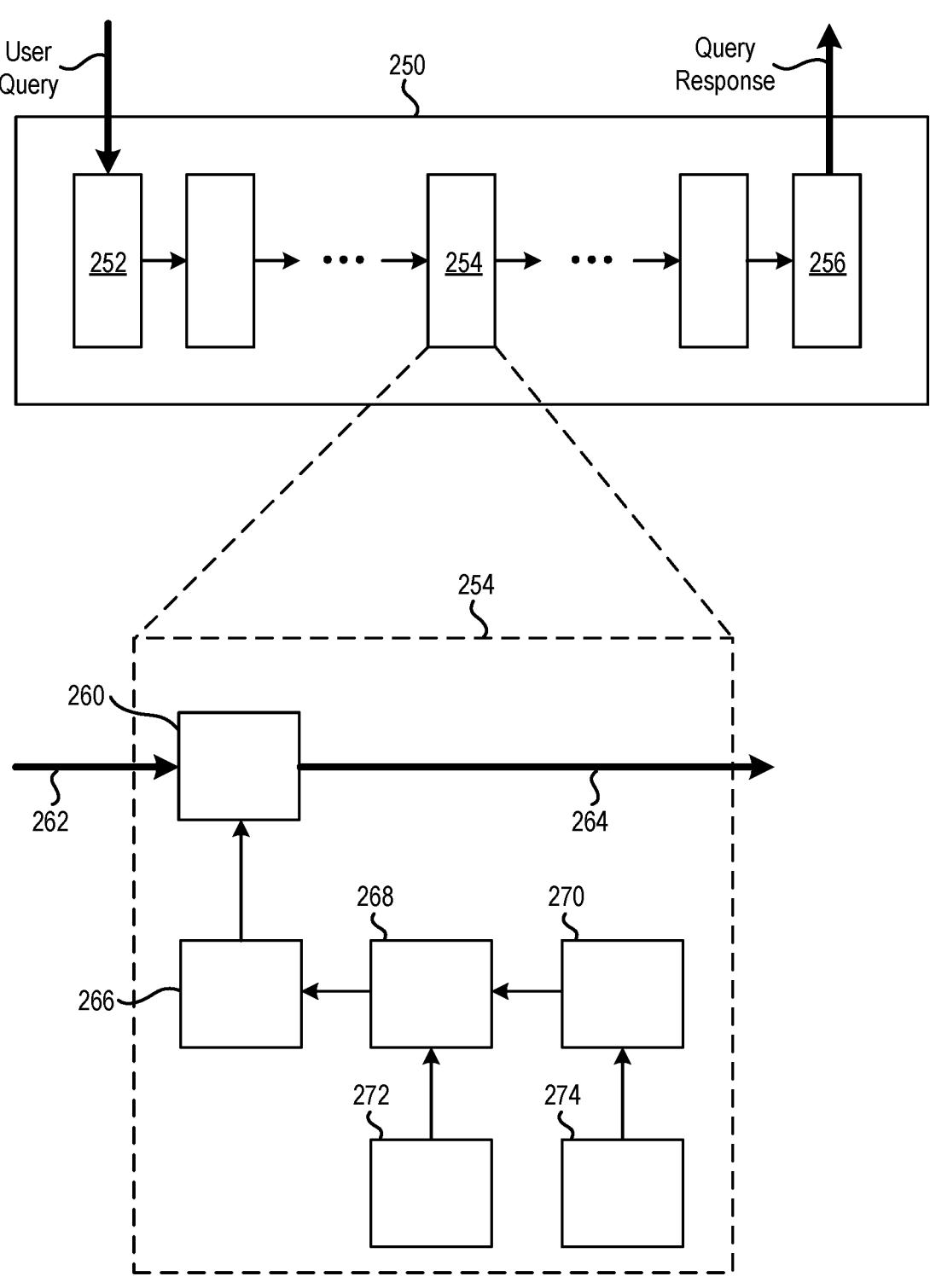
FIG. 2B is a representational view of a multi-layer neural network having a supplemental threat detection layer, in accordance with one approach.
Figure 2C:
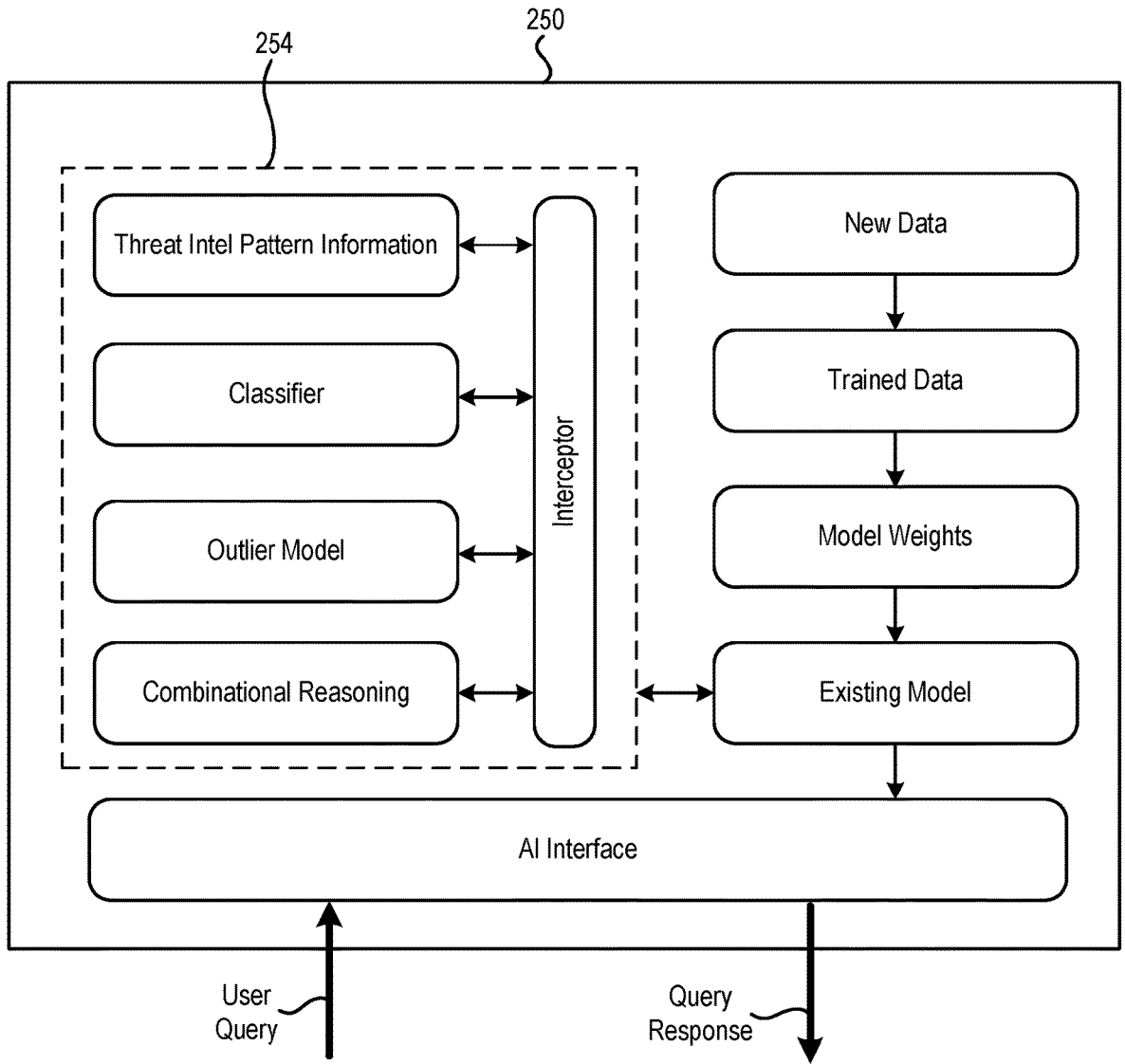
FIG. 2C is a representational view of a multi-layer neural network having a supplemental threat detection layer, in accordance with another approach.

Looking now to FIGS. 2B-2C, different representational views of a supplemental threat detection layer 254 which may be used to evaluate incoming user queries for authenticity, is illustrated in accordance with some approaches which are in no way intended to be limiting. As mentioned above, the threat detection layer 254 may be implemented in software and/or hardware. Accordingly, in some approaches the threat detection layer 254 may be appended to and/or injected in the existing layers of a neural network. In other approaches, performance of the threat detection layer 254 (e.g., see method 300 of FIG. 3A below) may be programmed into a processor set that includes one or more chip based components, e.g., such as AIUs, GPUs, FPGAs, etc. It follows that any details of the threat detection layer 254 described herein may be included in and implemented logically and/or physically by AI module 213 and/or 238 of FIG. 2A to evaluate whether received user queries should be satisfied, e.g., as would be appreciated by one skilled in the art after reading the present description.

Looking first to FIG. 2B, there the supplemental threat detection layer 254 is shown as being part of a larger, multi-layer neural network 250. The multi-layer neural network 250 uses an initial layer 252 to initiate the evaluation of a received user query. Moreover, each layer of the neural network 250 evaluates the data provided by the preceding layer, and produces weight values that are used to determine how the query is processed. For example, a layer of the neural network 250 that produces a weight value that is below a predetermined threshold may block data from being passed to a next layer of the neural network 250. However, a layer of the neural network 250 that produces a weight value that is above a predetermined threshold may allow data to be passed to a next layer of the neural network 250.

Thus, the threat detection layer 254 is used to evaluate the user query in response to receiving data from a preceding layer of the neural network 250. In situations where the threat detection layer 254 determines the user query is legitimate, data is passed to a next layer of the neural network such that the user query may be processed and responded to. For instance, a query response is provided as a result of a final layer 256 of the neural network 250 providing a sufficiently large weight value. However, in situations where the threat detection layer 254 determines the user query is illegitimate (e.g., malicious), data is not passed to a next layer of the neural network and the user query is effectively rejected (not responded to). In addition to rejecting a user query identified as being illegitimate, one or more warnings may be sent to a system administrator, the rejected user query may be stored in memory, the rejected user query may be used to perform model retraining, etc.

Returning to the threat detection layer 254, the "legitimacy" of a user query or whether a user query is "illegitimate" may be determined based at least in part on data received from preceding layers. For example, the detailed view of the threat detection layer 254 shows that an interface 260 with a remainder of the layers in the neural network 250 receives data 262 from a preceding layer. The interface 260 may also pass data 264 to one or more subsequent layers of the of the neural network 250 in response to determining the user query is legitimate. In other words, the threat detection layer 254 produces a weight value that supports generating a response to the user query, and passes data along to a next layer of the neural network 250. The weigh values produced by the other layers in the neural network 250 may thereby be evaluated to make an ultimate decision on if and how the user query should be responded to.

The data 262 received at the threat detection layer 254 includes information associated with the user query initially received. For instance, the data 262 may include the user query itself (e.g., an audio recording, text entered by a user, etc.), metadata outlining an intent of the user query, weight values produced by previous layers of the neural network, information describing the user that issued the user query, etc. This data 262 is preferably evaluated by the threat detection layer 254 in the context of (e.g., compared to) illegitimate query trends. Accordingly, combinational reasoning 268 is used to determine whether the user query is illegitimate, based at least in part on the output of a classifier 270 and/or behavioral information received from a threat intel pattern 272. The threat intel pattern 272 continuously provides updates to trends in malicious queries identified over time with TTPs and other information. Similarly, the classifier 270 receives activation data 274 that is updated over time to reflect new illegitimate query trends that are identified. The classifier 270 may thereby function as a behavioral classifier that is continually updated based on the trends that are identified in the received activation data 274.

It should be noted that the threat intel pattern 272 may provide information from a number of different sources. For example, in some approaches the threat intel pattern 272 receives information collected by other neural networks in response to processing illegitimate queries. In some approaches the threat intel pattern 272 is produced by an application running in the threat detection layer 254. In other approaches, the threat intel pattern 272 is generated based on previous user queries received, other identified illegitimate queries, a history associated with the user that issued the query, etc. Similarly, the activation data 274 may be received from a number of different sources that are able to provide behavioral information derived from key trends that have been identified.

The combinational reasoning 268 thereby receives a first input from the classifier 270, that is based at least in part on the activation data 274. The combinational reasoning 268 also receives a second input that is based on the threat intel pattern 272. In preferred approaches, the combinational reasoning 268 allows for the inputs received from the behavioral classifier 270 and the behavioral information received from the threat intel pattern 272 to be consolidated into weight values. Neural networks apply one or more weights to each layer of the network. Accordingly, approaches herein introduce a threat detection layer 254 that provides additional weightage based on the legitimacy of the query, which will be appended to the existing layers of the neural network. Approaches herein are thereby able to evaluate received queries and screen them for malicious attempts to exploit characteristics of the neural network, e.g., as would be appreciated by one skilled in the aft after reading the present description.

The consolidated output produced by the combinational reasoning 268 is further provided to an outlier model 266 that implements double loop learning on the output. The double loop learning may thereby be performed on the weight values produced by the combinational reasoning 268 to optimize the output for threat detection by performing a method like quantization, or knowledge distillation, or some other method. It follows that in some approaches, performing the double loop learning on the weight value includes trimming and/or condensing the weight values into the threat detection layer. The weight values are preferably trimmed and/or condensed in such a way that impact on performance of the neural network as a whole is minimized. The trimming and/or condensing may thereby be based on past performance, the output generated by one or more models trained on performance of the neural network, etc.

In other words, the outlier model 266 may be configured (e.g., trained) to optimize extracting (e.g., learning) information from the activation data 274 and information received from the threat intel pattern 272 as evaluated using the combinational reasoning 268. This information extracted by the outlier model 266 may thereby be implemented by the threat detection layer 254 as a whole to evaluate user queries more accurately. In other words, the double loop learning works to minimize the weight associated with adding the threat detection layer to the existing layers of the multi-layer neural network.

Looking now to FIG. 2C, the supplemental threat detection layer 254 is again shown as being part of the larger, multi-layer neural network 250. The neural network 250 is configured to receive a user query at an AI Interface that may functionally serve as a user interface. The AI Interface may provide a text entry prompt in some approaches, while in other approaches the interface may receive user queries from running applications, remote systems, user devices, etc.

In response to receiving the user query, the neural network 250 collects New Data associated with the User Query. The New Data is compared against Trained Data to produce Model Weights that are evaluated using an Existing Model, e.g., such as a multi-layer neural network. The threat detection layer 254 also supplements the Existing Model by evaluating the legitimacy of the User Query based on a number of factors. For instance, the threat detection layer 254 uses a Classifier to evaluate activation data and maintain an updated understanding of how known illegitimate queries may be submitted.

Moreover, Combinational Reasoning may be used to consolidate Threat Intel Pattern Information with an output of the Classifier. The consolidated output produced by the Combinational Reasoning is further provided to an Outlier Model that implements double loop learning. The double loop learning may thereby be performed on weight values produced by the Combinational Reasoning to optimize the output for threat detection by performing quantization, knowledge distillation, etc. It follows that in some approaches, performing the double loop learning on the weight value includes trimming and/or condensing the weight values into the Interceptor such that it may be integrated with the Existing Model. The weight values are preferably trimmed and/or condensed in such a way that impact on performance of the Existing Model as a whole is minimized.

Figure 3A:
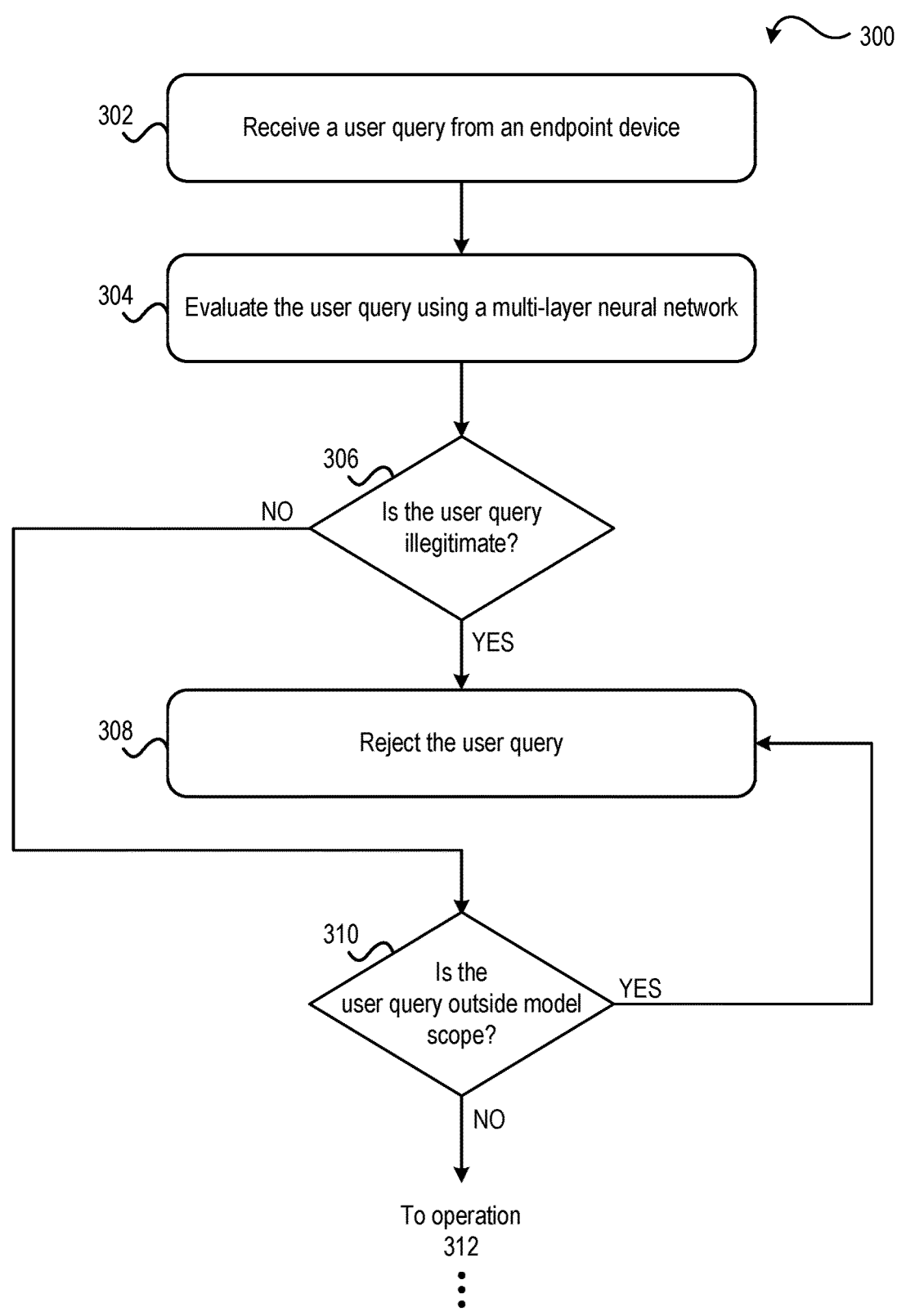
FIG. 3A is a flowchart of a method, in accordance with one approach.
Figure 3A:
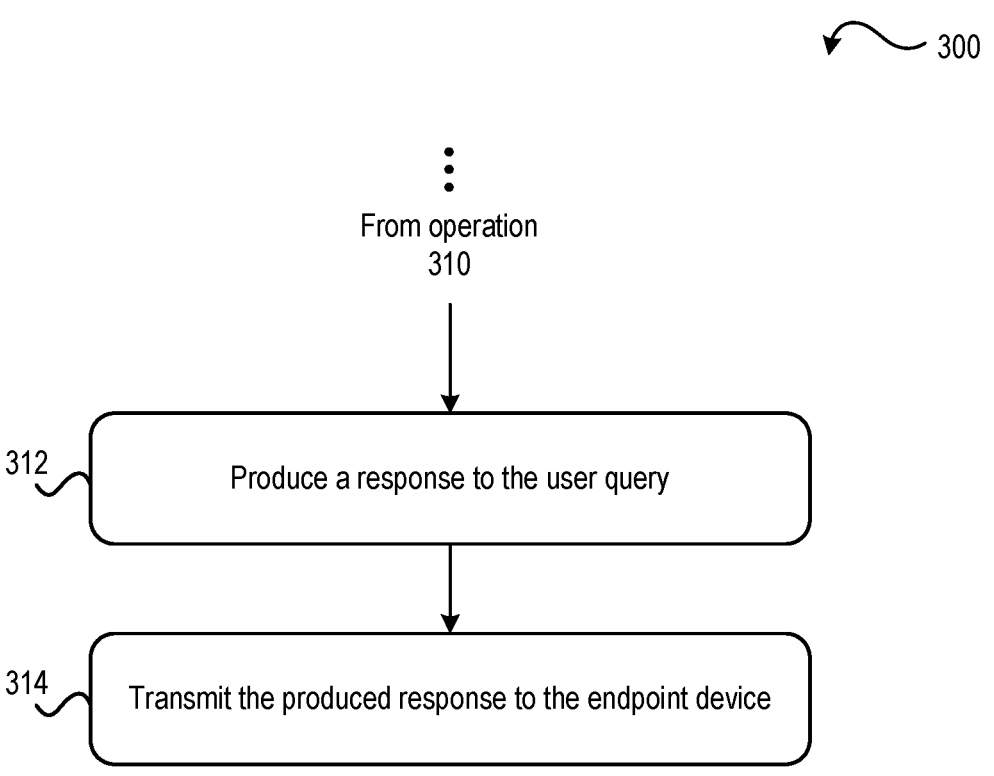

Looking now to FIG. 3A, a flowchart of a computer-implemented-method 300 for detecting and preventing illegitimate user queries is illustrated in accordance with one approach. In other words, method 300 includes inspecting user queries for potential threats targeting AI based models, e.g., such as neural networks including foundation models, large language models, etc. and/or combinations thereof. The method 300 may be performed in accordance with the present invention in any of the environments depicted in FIGS. 1-2C, among others, in various embodiments. Of course, more or less operations than those specifically described in FIG. 3A may be included in method 300, as would be understood by one of skill in the art upon reading the present descriptions.

Each of the steps of the method 300 may be performed by any suitable component of the operating environment. For example, in some approaches one or more of the operations in method 300 may involve one or more layers of a multi-layer neural network (e.g., see neural network 250 of FIGS. 2B-2C), which may be implemented in an AI based module (e.g., see AI modules 213, 238 of FIG. 2A). However, the method 300 may be partially or entirely performed by a controller, a processor, a computer, etc., or some other device having one or more processors therein. Moreover, the terms computer, processor and controller may be used interchangeably with regards to any of the embodiments herein, such components being considered equivalents in the many various permutations of the present invention.

For those embodiments having a processor, the processor, e.g., processing circuit(s), chip(s), and/or module(s) implemented in hardware and/or software, and preferably having at least one hardware component may be utilized in any device to perform one or more steps of the method 300. Illustrative processors include, but are not limited to, a central processing unit (CPU), an application specific integrated circuit (ASIC), a FPGA, an AIU, a GPU, etc., combinations thereof, or any other suitable computing device known in the art.

As shown, operation 302 includes receiving a user query from an endpoint device. As mentioned above, an endpoint device may include a user device (e.g., laptop, mobile phone, tablet, etc.), an edge node, a dedicated user interface, etc. Accordingly, the user query may be received from any number of locations. The type and/or complexity of user query that is received may also vary depending on the situation. For example, responding to some user queries may involve providing a more detailed and/or specific type of response in comparison to less complex and/or different types of queries.

Moreover, the same user queries may be received more than once over time. Each time a specific user query is received, the answer provided, and any resulting user feedback, are preferably stored such that they may be referred to a next time the same user query is received. This desirably improves response times and reduce compute overhead by utilizing past performance.

In response to receiving the user query, method 300 advances from operation 302 to operation 304. There, operation 304 includes evaluating the user query using a multi-layer neural network. As noted above, the neural network used to evaluate the received user query preferably includes a supplemental threat detection layer that is configured to evaluate the legitimacy of the user query. The threat detection layer may thereby allow for the neural network to intentionally reject user queries identified as being illegitimate, and selectively respond to user queries identified as not being malicious.

Accordingly, operation 306 determines whether the received user query is actually illegitimate. As noted above, the "legitimacy" or "illegitimacy" of a query may be based at least in part on results produced by a threat detection layer of a neural network used to evaluate the user query in operation 304. Operation 306 may thereby evaluate one or more weight values produced by layers (e.g., a threat detection layer) of the neural network to determine whether the query is illegitimate (e.g., intends to maliciously exploit aspects of the neural network). Method 300 is shown as advancing to operation 308 in response to determining (e.g., using the threat detection layer) that the user query is illegitimate for some reason. There, operation 308 includes intentionally rejecting the user query. In addition to rejecting the user query, one or more warnings may be sent to a system administrator, the rejected user query may be stored in memory, the rejected user query may be used to perform model retraining, etc.

However, method 300 advances from operation 306 to operation 310 in response to determining that the user query is legitimate and not malicious. There, operation 310 includes determining whether the user query is outside the scope of the models available to evaluate and respond to the user query. In other words, operation 310 includes determining whether the user query involves the delivery and/or inference of data that is outside a model scope of the multi-layer neural network, intentionally rejecting the user query. In response to determining the user query does involve data outside the model scope of the neural network, method proceeds from operation 310 to operation 308 such that the user query is rejected. It should be noted that model "scope" as used herein refers to the amount and/or type of information that the model has been trained to provide accurate responses to. For example, a user query requesting access to confidential information would be outside the scope of a neural network trained to evaluate spoken user queries and simulate simple human interaction (e.g., conversation).

Method 300 alternatively proceeds from operation 310 to operation 312 in response to determining that the user query involves data that is within the scope of the neural network. There, operation 312 includes producing a response to the user query, while operation 314 includes transmitting the produced response to the endpoint device that originally issued the user query.

Figure 3B:
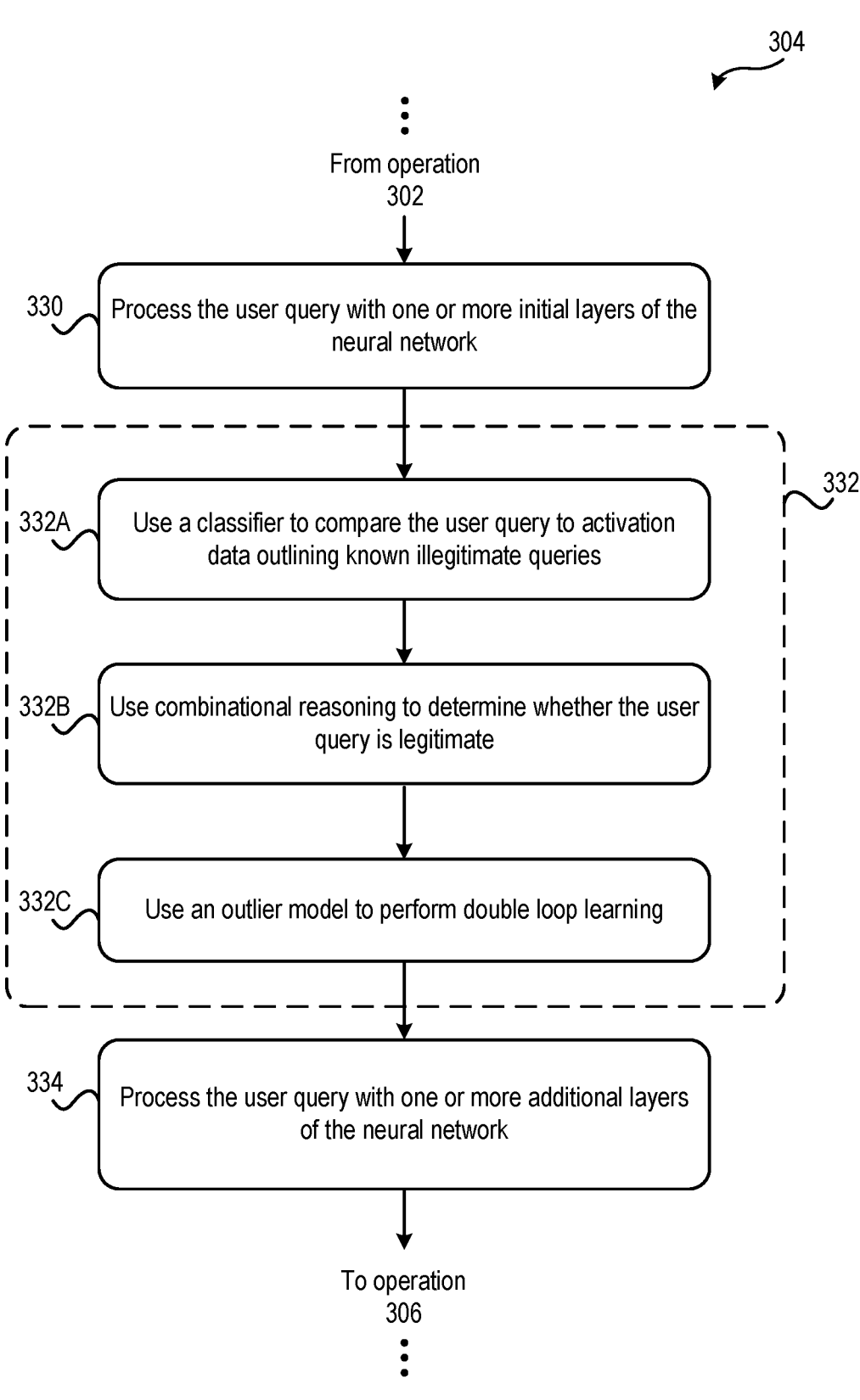
FIG. 3B is a flowchart of sub-operations for one of the operations in the method of FIG. 3A, in accordance with one approach.

Looking now to FIG. 3B, exemplary sub-operations of using a multi-layer neural network to evaluate a received user query are illustrated in accordance with one approach. It follows that one or more of these sub-operations may be used to perform operation 304 and/or make the determination in operation 306 of FIG. 3A. However, it should be noted that the sub-operations of FIG. 3B are illustrated in accordance with one approach which is in no way intended to be limiting.

As shown, sub-operation 330 includes processing the user query with one or more initial layers of the neural network. In other words, sub-operation 330 includes using one or more initial layers to initiate the evaluation of the user query. The one or more initial layers may be configured differently depending on the approach. However, each layer of the neural network evaluates the data provided by the preceding layer, and produces weight values that are used to determine whether the data is advanced to a next layer of the neural network. The weights produced by the layers of the neural network thereby affects how the user query is processed. For example, a layer of the neural network that produces a weight value that is below a predetermined threshold may block data from being passed to a next layer of the neural network. However, a layer of the neural network that produces a weight value that is above a predetermined threshold may allow data to be passed to a next layer of the neural network.

The flowchart proceeds from sub-operation 330 to sub-operation 332 in response to receiving an output from the initial layers at a supplemental threat detection layer of the neural network. There, sub-operation 332 includes using the threat detection layer to process the user query. In other words, the threat detection layer is used to evaluate the user query in response to receiving data from a preceding layer of the neural network.

Using the threat detection layer to evaluate the user query involves a number of steps as shown. For instance, step 332A includes using a classifier to compare the user query to activation data outlining known illegitimate queries. In other words, a classifier is used in step 332A to compare the user query to activation data outlining queries that have been labeled as malicious for attempting to exploit characteristics of AI based models. The activation data is preferably updated over time to reflect new illegitimate (e.g., malicious) query trends that are identified in order to maintain an updated understanding of how queries may be used to exploit model characteristics. The classifier in step 332A may thereby function as a behavioral classifier that is continually updated based on the trends that are identified in the activation data.

Proceeding from step 332A to step 332B, combinational reasoning is used to determine whether the user query is legitimate. The combinational reasoning determines the legitimacy of the user query based at least in part on: an output of the classifier and/or behavioral information received from a threat intel pattern. The combinational reasoning may thereby receive a first input from the classifier, the first input being based at least in part on the activation data. The combinational reasoning may also receive a second input that is based on the threat intel pattern.

The threat intel pattern may continuously provide updates to trends in malicious queries identified over time with TTPs and other information. The behavioral information received from the threat intel pattern is thereby continually updated based on key trends and/or tactics, techniques, and procedures (TTPs) targeting AI workloads. It should be noted that the threat intel pattern may provide information from a number of different sources. For example, in some approaches the threat intel pattern includes information collected by other neural networks in response to processing illegitimate queries. In some approaches the threat intel pattern is produced by an application running in the threat detection layer. In other approaches, the threat intel pattern is generated based on previous user queries received, other identified illegitimate queries, a history associated with the user that issued the query, etc.

In preferred approaches, the combinational reasoning implemented in step 332B allows for the inputs received from the behavioral classifier and the behavioral information to be consolidated into weight values. Neural networks apply one or more weights to each layer of the network. Accordingly, the threat detection layer as described herein may provide additional weightage values that are based at least in part on the legitimacy of the query. These additional weightage values are appended to the existing layers of the neural network, allowing approaches herein to evaluate received queries and screen them for malicious attempts to exploit characteristics of the neural network, e.g., as would be appreciated by one skilled in the aft after reading the present description.

The consolidated output produced by the combinational reasoning in step 332B is further provided to an outlier model that implements double loop learning on the output. See step 332C. There, the double loop learning may be performed on the weight values produced in step 332B by the combinational reasoning, to optimize the output for threat detection by performing quantization, knowledge distillation, etc. It follows that in some approaches, performing the double loop learning in step 332C includes trimming and/or condensing the weight values such that they may be applied by the threat detection layer on the weight values produced by a remainder of the layers in the neural network. For instance, the weight values are preferably trimmed and/or condensed in such a way that impact on performance of the neural network as a whole is minimized. The trimming and/or condensing may thereby be based on past performance, the output generated by one or more models trained on performance of the neural network, etc.

It follows that the outlier model that may be implemented in step 332C can be configured (e.g., trained) to optimize extracting (e.g., learning) information from the activation data and threat intel pattern information as evaluated using the combinational reasoning. This information extracted by the outlier model may thereby be implemented by the threat detection layer as a whole to evaluate user queries more accurately. In other words, the double loop learning works to minimize the weight associated with adding the threat detection layer to the existing layers of the multi-layer neural network, e.g., as would be appreciated by one skilled in the art after reading the present description.

In situations where the threat detection layer determines the user query is legitimate, data is passed to a next layer of the neural network such that the user query may be processed and responded to. Accordingly, the flowchart of FIG. 3B proceeds from sub-operation 332 to sub-operation 334 in response to determining the user query is legitimate (e.g., not malicious). There, sub-operation 334 includes processing the user query with one or more additional layers of the neural network. In other words, sub-operation 334 includes using one or more layers that receive an output from the threat detection layer, to continue the evaluation of the user query. The one or more additional layers may be configured differently depending on the approach.

It should be noted that while approaches herein describe the supplemental threat detection layer being injected between layers of existing models (e.g., neural networks), this is in no way intended to be limiting. For example, in some approaches the threat detection layer may actually be a first layer of a multi-layer neural network. In other approaches the threat detection layer may be a final layer of a multi-layer neural network. In still other approaches, the functional capabilities of the threat detection layer may be programmed in physical components (e.g., chips) such as a GPUs, AIUs, FPGAS, etc., e.g., as would be appreciated by one skilled in the art after reading the present description.

It follows that method 300 is desirably able to provide agent based behavioral threat detection on production level foundational models. This is achieved at least in part by using predictive analytics to identify the malicious queries based on TTPs, and differentiate them from legitimate (e.g., genuine and not malicious) prompts. This allows the approaches herein to efficiently identify prompt obfuscation associated with facilitating multistage malware attacks. Approaches herein are able to capture and classify the actual techniques used to perform prompt obfuscation.

Approaches herein are also able to capture and classify drive-by download techniques, as well as identify sensitive content with various degrees of severity upon inference. Some approaches compare model scope to the user queries that are received in order to avoid issuing an inaccurate response. Approaches are thereby able to detect and prevent potential threats, which may otherwise lead to new types of cyber-attacks and/or other issues. For instance, classifier may be used to identify malicious prompt techniques based on behaviors. Moreover, the inference pipeline may be intercepted in order to detect threats based on TTPs. Known obfuscation techniques on prompt templates may be searched for, and fragments of TTPs may be used to identify new possible obfuscation techniques with relative certainty. Moreover, approaches herein may be implemented (e.g., injected into) existing multi-layer neural networks, such as foundation models, large language models, etc., e.g., as would be appreciated by one skilled in the art after reading the present description.

It will be clear that the various features of the foregoing systems and/or methodologies may be combined in any way, creating a plurality of combinations from the descriptions presented above.

It will be further appreciated that implementations of the present invention may be provided in the form of a service deployed on behalf of a customer to offer service on demand.

The descriptions of the various implementations of the present invention have been presented for purposes of illustration, but are not intended to be exhaustive or limited to the implementations disclosed. Many modifications and variations will be apparent to those of ordinary skill in the art without departing from the scope and spirit of the described implementations. The terminology used herein was chosen to best explain the principles of the implementations, the practical application or technical improvement over technologies found in the marketplace, or to enable others of ordinary skill in the art to understand the implementations disclosed herein.

What is claimed is:

1. A computer-implemented method (CIM), comprising:
in response to receiving a user query from an endpoint device, causing a multi-layer neural network to evaluate the user query by:
    processing the user query with one or more initial layers of the neural network;
    in response to receiving an output from the initial layers at a supplemental threat detection layer of the neural network, processing the user query with the threat detection layer by:
        using a classifier to compare the user query to activation data outlining known illegitimate queries,
        using combinational reasoning to determine whether the user query is legitimate based at least in part on: an output of the classifier, and behavioral information received from a threat intel pattern,
        wherein the using of the combinational reasoning to determine whether the user query is legitimate includes:
            consolidating the output of the classifier and the behavioral information into weight values, and
            using an outlier model to perform double loop learning on the weight values produced by the combinational reasoning; and
    in response to the threat detection layer determining the user query is not legitimate, intentionally rejecting the user query.

2. The CIM of claim 1, wherein performing the double loop learning on the weight value includes trimming and condensing the weight values into the threat detection layer.

3. The CIM of claim 1, further comprising:
in response to the threat detection layer determining the user query is legitimate, passing an updated output to one or more subsequent layers of the of the neural network; and
in response to the neural network producing a response to the user query, transmitting the produced response to the endpoint device.

4. The CIM of claim 3, wherein the output and the updated output include weight values.

5. The CIM of claim 1, wherein the behavioral information received from a threat intel pattern is continually updated based on key trends and/or tactics, techniques, and procedures (TTPs) targeting AI workloads.

6. The CIM of claim 1, wherein the using of the combinational reasoning to determine whether the user query is legitimate includes:
determining whether the user query is outside a model scope of the multi-layer neural network.

7. The CIM of claim 6, further comprising:
in response to determining that the user query is outside a model scope of the multi-layer neural network, intentionally rejecting the user query.

8. The CIM of claim 1, wherein the CIM is performed by a processor set that includes one or more chip components selected from the group consisting of: Artificial Intelligence Units, graphics processing units, and Field Programmable Gate Arrays.

9. A computer system (CS), comprising:
a processor set;
a set of one or more computer-readable storage media;
program instructions, collectively stored in the set of one or more storage media, for causing the processor set to perform the following computer operations:
    in response to receiving a user query from an endpoint device, cause a multi-layer neural network to evaluate the user query by:
        processing the user query with one or more initial layers of the neural network,
        in response to receiving an output from the initial layers at a supplemental threat detection layer of the neural network, processing the user query with the threat detection layer by:
            using a classifier to compare the user query to activation data outlining known illegitimate queries,
            using combinational reasoning to determine whether the user query is legitimate based at least in part on: an output of the classifier, and behavioral information received from a threat intel pattern,
            wherein the using of the combinational reasoning to determine whether the user query is legitimate includes:
                consolidating the output of the classifier and the behavioral information into weight values, and
                using an outlier model to perform double loop learning on the weight values produced by the combinational reasoning; and
        in response to the threat detection layer determining the user query is not legitimate, intentionally rejecting the user query.

10. The CS of claim 9, wherein performing the double loop learning on the weight value includes trimming and condensing the weight values into the threat detection layer.

11. The CS of claim 9, wherein the program instructions are for causing the processor set to further perform the following computer operations:
in response to the threat detection layer determining the user query is legitimate, pass an updated output to one or more subsequent layers of the of the neural network; and
in response to the neural network producing a response to the user query, transmit the produced response to the endpoint device.

12. The CS of claim 11, wherein the output and the updated output include weight values.

13. The CS of claim 9, wherein the behavioral information received from a threat intel pattern is continually updated based on key trends and/or tactics, techniques, and procedures (TTPs) targeting AI workloads.

14. The CS of claim 9, wherein the using of the combinational reasoning to determine whether the user query is legitimate includes:

determining whether the user query is outside a model scope of the multi-layer neural network; and in response to determining that the user query is outside a model scope of the multi-layer neural network, intentionally rejecting the user query.

15. The CS of claim 9, wherein the processor set includes one or more chip components selected from the group consisting of: Artificial Intelligence Units, graphics processing units, and Field Programmable Gate Arrays.

16. A computer program product (CPP), comprising:

a set of one or more computer-readable storage media; and program instructions, collectively stored in the set of one or more storage media, for causing a processor set to perform the following computer operations:

in response to receiving a user query from an endpoint device, cause a multi-layer neural network to evaluate the user query by:

processing the user query with one or more initial layers of the neural network, in response to receiving an output from the initial layers at a supplemental threat detection layer of the neural network, processing the user query with the threat detection layer by:

using a classifier to compare the user query to activation data outlining known illegitimate queries, using combinational reasoning to determine whether the user query is legitimate based at least in part on: an output of the classifier, and behavioral information received from a threat intel pattern, and wherein the using of the combinational reasoning to determine whether the user query is legitimate includes:

consolidating the output of the classifier and the behavioral information into weight values, and using an outlier model to perform double loop learning on the weight values produced by the combinational reasoning; and in response to the threat detection layer determining the user query is not legitimate, intentionally rejecting the user query.

* * * * *